Dec. 13, 1932.   R. E. SCHURTZ   1,890,531
AUTOMATIC WEAK LIQUOR CONTROL
Filed Feb. 4, 1928   3 Sheets-Sheet 1
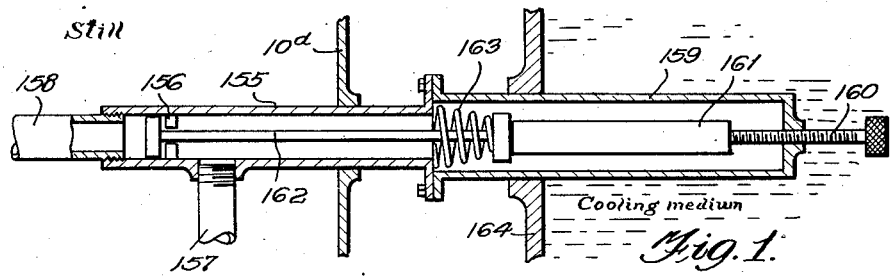
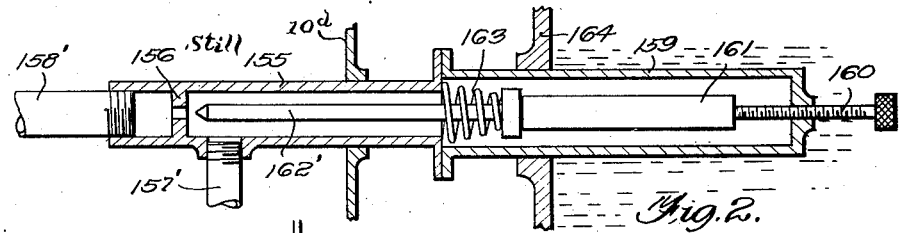
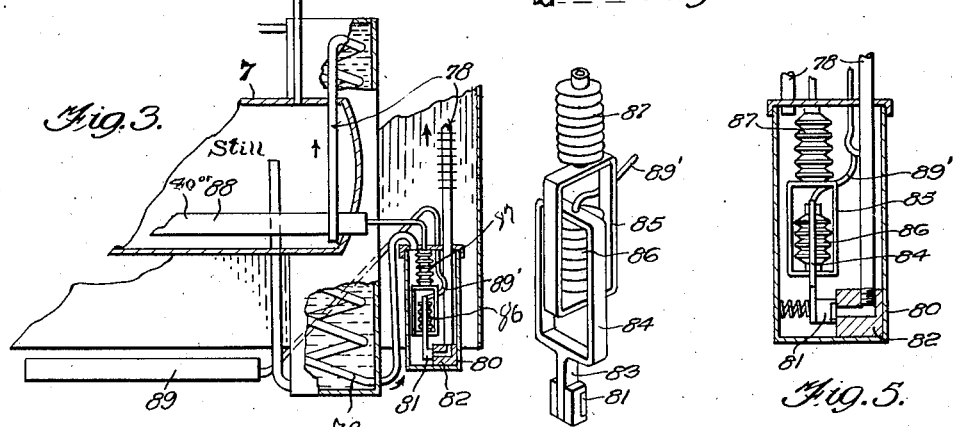
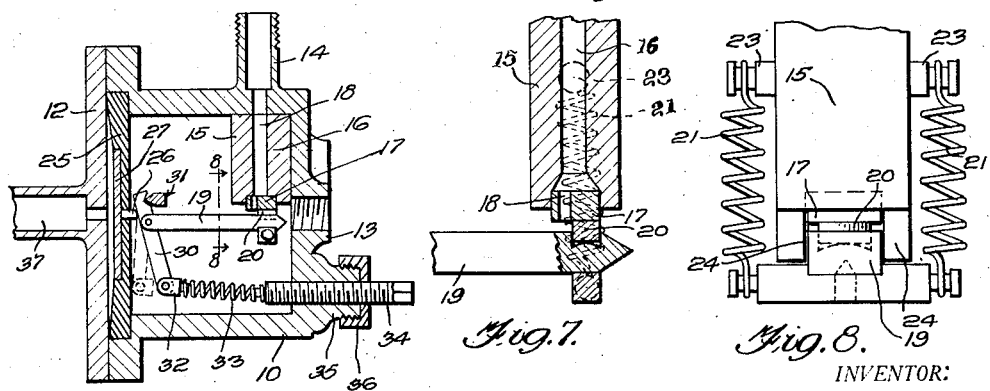
INVENTOR:
RALPH E. SCHURTZ,
BY H. S. Woodward
ATTORNEY.

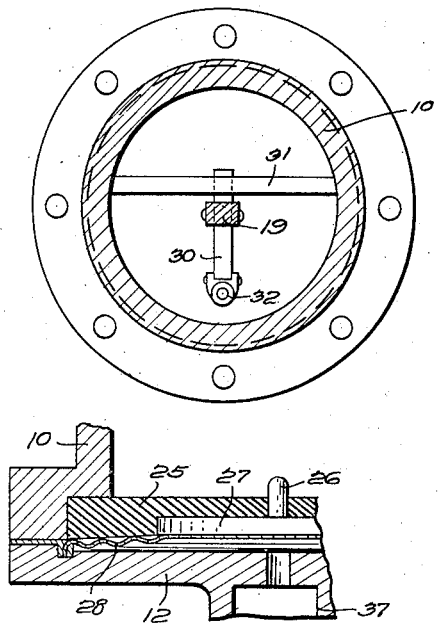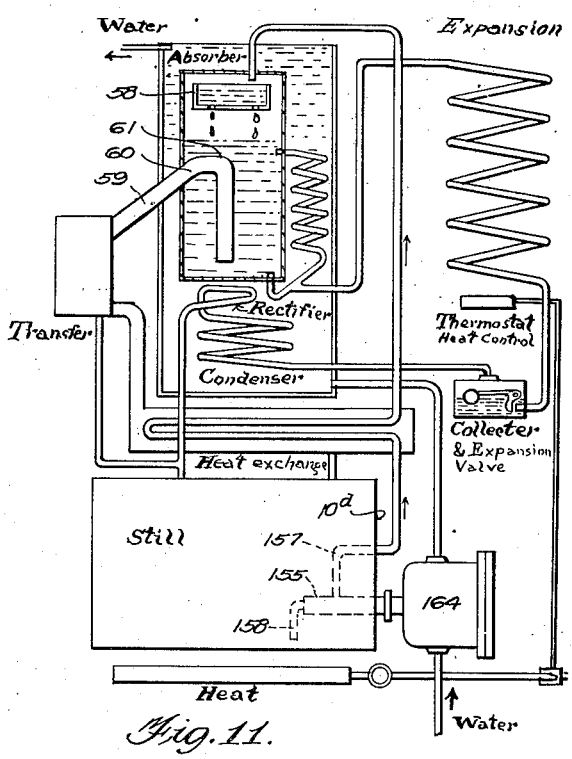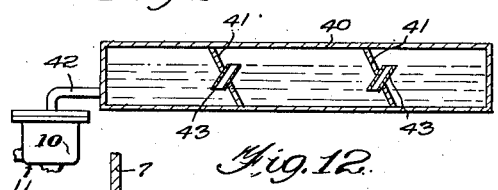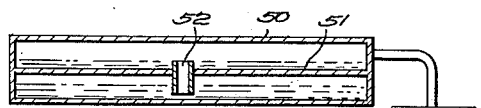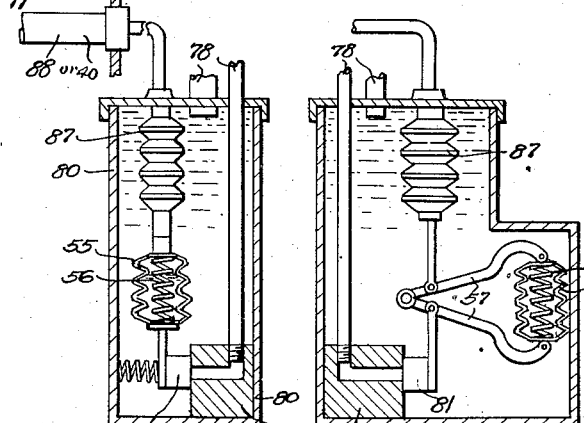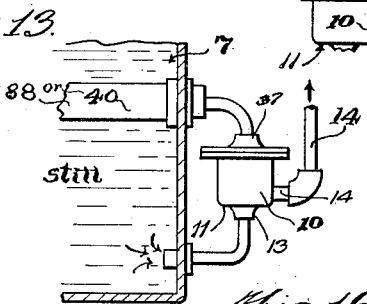

Dec. 13, 1932.  R. E. SCHURTZ  1,890,531
AUTOMATIC WEAK LIQUOR CONTROL
Filed Feb. 4, 1928  3 Sheets-Sheet 3
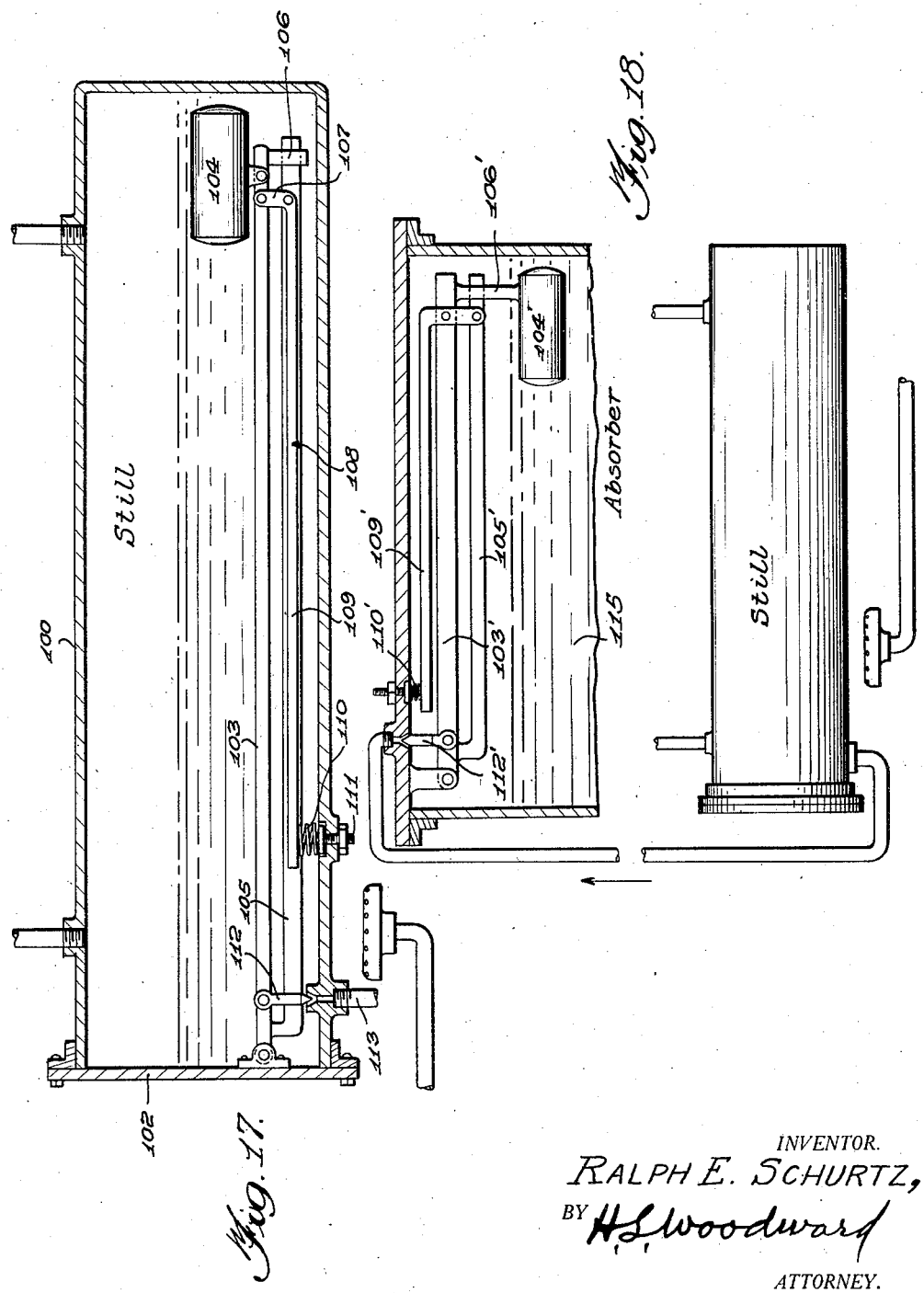
INVENTOR.
RALPH E. SCHURTZ,
BY H.L.Woodward
ATTORNEY.

Patented Dec. 13, 1932

1,890,531

UNITED STATES PATENT OFFICE

RALPH E. SCHURTZ, OF KANSAS CITY, MISSOURI, ASSIGNOR, BY MESNE ASSIGNMENTS, OF ONE-HALF TO R. W. BAILEY AND C. T. JOBES, BOTH OF KANSAS CITY, MISSOURI

AUTOMATIC WEAK LIQUOR CONTROL

Application filed February 4, 1928. Serial No. 251,978.

The invention has for an object to present improved appliances especially adapted to use in controlling the movement of absorbent or other refrigerant-carrying material (usually an absorbent) in refrigerating systems, and in the present embodiment has been used in systems of the character indicated in my Patent #1,414,527, May 2, 1922, and applications hereinafter mentioned, and this application is in part a continuation (with respect to Figures 13 and 14) of my application Ser. No. 267,614, filed December 20, 1918. It is also a continuation in part (with respect to Figure 6) of my application Ser. No. 639,860, filed May 18, 1923. It is also a continuation in part of my application Ser. No. 635,240, filed April 28, 1923, with respect to Figures 1 and 4 of that application.

It is an aim of the invention to provide a means which may be utilized to cause a refrigerating system to automatically respond to the seasonal or special requirements of a cold storage, food cooling, or ice-making plant, without requiring attention from any attendant or other person in adjusting the machine to adapt it properly to operate efficiently at the change of weather, or under exceptional temperature changes of the atmosphere or water supply. My present invention is applicable to use in many distillation refrigerating systems of various kinds. To distinguish the particular novel function of my invention, it may be pointed out that in systems and apparatus such as disclosed in my said applications and patent, I sometimes provide means responsive to rise of temperature in the still beyond a predetermined point to permit the pressure in the still to displace liquor from the still to the absorber (usually at a higher level) by the pressure existing in the still. This means in certain of my prior constructions consists of a valve operated by a thermostatic element exposed within the still.

As is well known, every temperature of aqua ammonia of a given strength will involve a corresponding pressure, and likewise the liquefying pressure of anhydrous ammonia will vary as the temperature. In such systems as indicated, in the summer season a high pressure for condensing the gas must be generated in the still and under such pressure a much higher temperature will be required to lower the refrigerant content of the liquor to a desired minimum than would be required during the winter weather when the ammonia would condense to a liquid at much lower pressures and a comparatively low still temperature would be involved when the liquor has been reduced to the desired strength. It may be understood, then, that a simple thermostat in the still, would alone only be automatic in regulating the transfer of weak liquor within a narrow range of external temperature. It alone will not respond to both summer and winter requirements without adjustment or change.

It is therefore an important attainment of my invention that I am able to provide equipment which will automatically meet these widely varying requirements of seasonal or weather or other like conditions in controlling the transfer of weak liquor from a still. My invention at the same time enables me to use a thermostat in the still as the prime controlling device for the weak liquor transfer, but with cooperating means to cause it to operate at different temperatures at different times, according to the temperature of the cooling medium for the condenser.

It is also an object of the invention to present desirable constructions in apparatus for putting the invention to use, to the end that such apparatus may be cheaply constructed and will operate efficiently and dependably with a minimum of wear and deterioration. Additional objects, advantages and features of invention reside in the construction, and arrangement and combination of parts, as may be understood from the following description, and accompanying drawings, in which, Figure 1 is a representation of one form of the device as shown in Figure 13 of my application of 1918 above mentioned, Figure 2 is a similar view of a modification of the first mentioned device, shown in Figure 14 of said application.

Figures 3 and 4 are views of a further form of the device as shown in my application No. 635,240 (Figs. 1 and 4).

Figure 5 is a detail of the last mentioned identical modification as shown in Figure 6 of my application No. 639,860.

Figure 6 is a vertical section of a preferred construction of the apparatus.

Figure 7 is a detail of the valve.

Figure 8 is a vertical section on the line 8—8 of Figure 6.

Figure 9 is a fragmentary vertical section at right angles to Figure 6.

Figure 10 is a detail of the diaphragm mounting.

Figure 11 is a diagram of a system including my invention.

Figure 12 is a detached section of a construction for the tube 88.

Figure 13 is a similar view of a modification.

Figure 14 is a modification of the device of Figures 3 to 5.

Figure 15 is a still further modification of the structure of Figure 14.

Figure 16 is a fragmentary view of the still equipped with the device of Figures 6 to 10.

Figure 17 is a longitudinal sectional view of a modified device for controlling flow of weak liquor from the still to the absorber, its action modified by variation in temperature incident to changes of season or otherwise.

Figure 18 is a modification of the last mentioned structure.

In Figures 1 and 11, 10—d represents the head of a still, through which there is inserted a tube 155, projecting a distance into the still and having near the inner end an annular concentric seat 156. Leading into the tube 155 intermediately of its length and between the wall 10—d and the seat 156 there is a pipe 157, while at the extremity of the tube 155 inwardly of the seat 155 there is extended a pipe 158. One of these pipes is intended to communicate with the lower part of the interior of the still for receiving weak liquor, while the other is intended to be extended to the absorber to deliver the liquor thereto, with any appropriate heat exchange or cooling means associated therewith. The tube 155 is flanged outwardly of the still and secured to this flange there is a corresponding flanged end of a tube 159 of somewhat larger diameter than the first mentioned tube, and having a closed outer end through which there is screwed a screw 160 having a knurled head for manipulation to adjust the device. Connected to the inner end of this screw there is a rod 161, extending longitudinally of the tube, but stopping short of the connection between the tubes mentioned. A rod 162 is shown in the tube 155, extending through the seat 156 with clearance and having a valve head at its inner extremity adapted to engage the seat at times. The rod 162 is also headed at its opposite or outer end, the head being located closely adjacent the inner end of the rod 161, and a helical spring 163 is confined between the last mentioned head of the rod 162 and the end of the tube 155, whereby the spring tends to thrust the rod 162 longitudinally outward and seat the valve. Associated with the tube 159 there is an element 164 through which there circulates the medium utilized in cooling the condenser of the system in which the appliance is employed, or which may contain a substantial part of such cooling medium in communication with the body of the medium which surrounds the condenser coils. It is important to note that the rod 162 and tube 159 are formed of a metal with a high co-efficient of expansion, while the tube 155 and the rod 161 are formed of metal of a low co-efficient of expansion, whereby, under high temperature conditions in the still the rod 162 will expand more than the tube 155, resulting in moving the valve from the seat 156, and permitting flow of liquor from the still by reason of the pressure existing therein, as is well understood in such systems. When the cooling medium for the condenser is at a low temperature, the tube 159 being contracted, the inner head on the rod 162 will engage the rod 161 at a point nearer the seat 156 than when a high temperature prevails within the exterior of the medium, with the result that the valve will be unseated at a lower temperature in the still when there is a comparatively low temperature outside, these two devices working in opposition to each other in their effect. That is to say, expansion of the tube 159 tends to prevent unseating of the valve 156 when the rod 152 expands, and its contraction tends to cause earlier unseating of the valve when the rod 152 expands. This in conjunction with the adjusting screw 160 enables the device to be arranged to cause the apparatus to automatically accommodate itself to the seasons or other variations in temperature of the atmosphere externally of the system in case air is used as the cooling means for the condenser, and likewise for varying temperature of water from rivers or water supply systems.

In Figure 2 a similar principle is utilized to control the burner under the still, the tube construction being the same as before described, and pipes 157'—158' (corresponding to those numbered 157—158) being in communication with the tube 155 as before, but utilized to receive fuel from a supply and deliver it to the burner respectively. The spring, the outer rod and the screw are similarly mounted and correlated with a rod 162', corresponding to the rod 162 before mentioned but the rod 162' is provided with a needle valve located between the seat 156 and the outer end of the tube 155, so that instead of the valve opening under high temperature, it will close under high temperature by expansion of the rod 152' when the tube 155 is mounted in the still as indicated. The other end of the device or tube 159 may be located in the cooling medium as before mentioned, or in case water is used as cooling medium the tube 159 of either Figure 1 or 2 may be located in such manner as to be affected by the external atmosphere, and respond to variations thereof.

The two devices as illustrated may be used jointly in the same system or reconstructed as a combined device.

In Figures 3 to 5 inclusive, a still 7 is indicated from which there leads the weak liquor conduit 78, which, on the way to the absorber, opens into a valve box 80. From the box pipe is continued to the absorber in accordance with approved practice, as disclosed in my said patent and applications, or otherwise. Within the box the effluent pipe is provided with a port element 82, the port of which is closed or opened by a vertically sliding valve 81 carried upon a downwardly projecting stem 83 extending from a rectangular loop or frame element 84, the opposite or upper end of which is linked through a similar loop or frame 85 extending above so that the two may have relative longitudinal reciprocatory movement. Between the inner ends of the loops there is interposed and connected a thermostatic bellows 86 (of metal ordinarily) communicating with which there is a flexible pipe 89' which leads to a thermostatic tube 89 so located as to be exposed in the cooling medium utilized in the system, such as air or water. At the outer and upper end of the loop 85 another thermostatic bellows 87 is mounted, which is also mounted upon a removable cover of the box 80 and forming the support for the whole valve operating assembly. It has in communication therewith a pipe leading to a thermostatic tube 88 which is exposed within the still 7.

In the tubes 88 and 89 suitable expansible fluids may be used in accordance with the principles of such devices. I have used high boiling point petroleum in both tubes, corresponding to lubricating oil; mercury may also be used, and a different material may be used in each, if desired. It is practicable and may be found preferable to use aqua ammonia in the tube 88 in the still, and either ammonia or another material in the tube 88. Should they have different co-efficients of expansion or should one vaporize in action, the operative connections, bellows capacities or adjusting devices may be proportioned or adjusted to compensate for such differences. The modification of the specific gravity of the ammonia by increasing or decreasing the amount of water content may be utilized also in arranging the device to work.

It may also be found expedient to combine the expansible liquid and expansible metal elements in accordance with the practices indicated.

In this connection, I have in Figures 6 to 9 presented an arrangement (to be later described) whereby the assurance of exact operation of the weak liquor control in an ammonia system may be secured by the mere expedient of using aqua ammonia in the tube 88 and making it of the same specific gravity as that which it is desired the liquor shall have when transferred from the still, or a related specific gravity greater or less. The same practice may also be carried out with other constructions, in accordance with this showing.

In the construction first described in the valve box, it is to be noted that the bellows 86 forms a connection between the frames 85 and 84, whereby movement of the one in either direction will likewise cause movement of the other, and the bellows 87 is utilized as the mounting means for the frame assembly. Consequently, upon expansion of fluid in the tube 88 with consequent extension of the bellows 87, the valve 81 will be moved upon its seat. As in Figure 4, the valve 81 has a wide face so that it may have exceptional lap toward both limits of its movement. The extent of this lap at either side is determined by the external temperature acting upon the thermostatic tube 89 by which the bellows 86 is actuated. It will be apparent that extension of the bellows 86 will raise the valve, increasing the lap at the upper side of the port, while contraction of the bellows incident to cool temperature will increase the lap at the lower side without involving any operation of the bellows 87. In consequence of this, when the atmospheric temperature is high and the bellows 86 expanded, a much greater movement is necessary before the valve opens than when a lower temperature prevails. A greater expansion of the thermostatic fluid in the tube 88 will consequently be involved to operate the valve during warm weather, necessitating development of a higher temperature in the still before operation of the valve 81 is accomplished for transferring weak liquid from the still to the absorber.

This construction in Figures 6 to 10 and 16 includes a bell-shaped case 10, having an integral head 11 at one end, the open end flanged to receive a cap-plate 12. Centrally of the head 11 a boss 13 is provided, tapped and threaded to receive an affluent pipe, while a lateral connection 14 is provided on the case for a second or effluent pipe connection. Within the case a thickened or inserted block portion 15 is provided, having two guide lugs 24 located near the center of the case. From the connection 14 a passage 16 opens through the part 15 between the lugs, a suitable recess in receiving a seat plate or port plate 17. This plate 17 has a port 18 formed therein slightly off the plate center and communicating with the passage 16. A longitudinally reciprocable rod 19 is located centrally of the case between the lugs having a valve 20 set in the side thereof and pressed against the plate 17 by springs 21 connected releasably to the rod 19 and extended to pins 23 set in the side of the thickened portion 15 of the case, on a line with the port so that the valve is drawn snugly against the plate 17. The bottom of the recess receiving the valve 20 is in the form of the segment of a sphere, while the valve is set loosely in the recess and is a simple circular disk of suitable material. By this manner of mounting the valve its accurate bearing upon the plate 17 is assured at all the positions of the rod 19. The open end of the case is rabbetted interiorly to receive snugly a plate 25, having a small central bore therethrough receiving slidably a pin 26 mounted upon a disk 27, the plate 25 being recessed to receive this disk slidably in the direction of its axis. The disk 27 is set upon a diaphragm 28 which is secured removably across the open end of the case by the cap-plate 12 on which the diaphragm is sealed. The lower end of the rod 19 is bifurcated and has mounted pivotally therein the medial part of a lever 30, having a short end projected beyond the center of the plate in one direction and formed on the inner side with a V-shaped notch receiving a knife-edge of a cross bar 31. The pin 26 is of a length to project slightly above the plate 25 and engage the lower side of the short end of the lever 30 intermediately between the knife edge bearing and rod 19. The opposite longer end of the lever is connected pivotally to a yoke 32 having a tenon set revolubly in the lower end of a protractile helical spring 33 extending upwardly adjacent the side of the case and having its upper end engaged with the inner end of an adjusting screw 34 which is threaded in the head 11. An outer portion of the screw is of plain cylindrical form, and around this there is formed upon the case a packing gland 35, upon which a packing box or nut 36 is threaded. A pipe terminal 37 is provided upon the cap-plate 12 communicating with the space between the cap plate and the diaphragm 28, the terminal 37 being intended to be connected with the thermostatic tube 88 or its equivalent in the still.

In operation, the pipe terminal 37 being connected to the thermostatic tube 88 as indicated, and pipe connections being made between the interior of the case and still, and between case and absorber, the screw 34 is adjusted so that the spring 33 presses the lever 30 upon the pin 26 and holds the diaphragm 28 at the outer part of its movement at any pressure below that at which it is desired to transfer liquor from the still to the absorber. When pressure in the thermostatic tube rises above this degree (subject to condenser pressure, as will be explained) the pin presses upon the lever 30, forcing it upwardly against the action of the spring 33 and moving the valve 20 above the port in the plate 17, permitting flow of liquor from the still to the absorber. The valve will remain in such open position until the pressure in the pipe 37 acting upon the diaphragm 28 falls below that which may be overcome by the spring 33, when the lever 30 is moved downwardly and the valve 20 closes the port of the plate 17, thereby stopping flow of liquor.

It will be apparent that when the plate 12 is removed all the parts may be manually removed from the case without use of tools, enabling ready assembly and repair of the device.

In the utilization of the ammonia solution as the thermostatic fluid for the operation of the still discharge valve, as shown in Figures 6 to 9, it should be understood that the advantage of counteracting control by which changes in atmospheric temperature or the temperature of the cooling water are compensated for in modified action of the valve operating device, is still retained by the organization of the parts shown. Thus, the condenser acting against the diaphragm in opposition to the pressure in the tube 88 performs the function of the auxiliary thermostatic tube 89 located outside the still in Figures 1 to 4.

In the operation of this preferred device, it will be appreciated that during the periods before the liquor in the still has been lowered to the gravity of that in the tube 88 the pressure in the still will be higher than in the tube. This is necessarily the case since the two are always at the same temperature and the stronger solution is capable of developing the higher pressure. When the liquor in the still has been lowered to the gravity of that in the tube, the two bodies of liquor will tend to develop the same pressure, but by the functioning of the condenser the still pressure is lower at this point. A little before or after a slight further lowering of gravity in the still the pressure from tube 88 on the diaphragm at the outer side will predominate sufficiently to operate the valve and cause a transfer of liquor to the absorber.

In this respect the condenser constitutes a means counteracting the tube 88 and its liquid in operating the diaphragm, in a degree directly proportional to the temperature of the cooling medium, and thereby compensating for change of season or weather temperature.

The preferred construction of the tube 88 when I employ aqua ammonia as the operating fluid includes a construction which will produce an agitation or other movement of the liquid or the gas when the temperature of the tube falls sufficiently to require absorption of the gas present therein. While this might be accomplished with valve or other mechanical arrangements, it is preferable to utilize means which will have no moving parts other than the liquor or gas. In one construction, therefore (Figure 12) I have formed the tube as an elongated cylinder 40 having a plurality of partitions 41, the cylinder being closed at each end and having a pipe 42 connected to one of the ends at the lower part and leading to the terminal 37 of the valve casing 10. The end of the cylinder receiving the pipe may be a bushing screwed over the end of the cylinder, and screwed into the head 10—d of the still at a low level. The partitions are inclined for convenience in assembly and each has a short tube 43 extending therethrough forming communication between the chambers on each side of the partition. The outer ends of these tubes— that is the ends next the pipe 42—are lower than their inner ends. The tube is preferably about two thirds full of aqua ammonia, and horizontal when installed. In the functioning of this tube, when a preponderating pressure develops therein, if the liquor level is below the upper or inner ends of the tubes, gas will bubble back through tubes 43 from the innermost chambers toward the outermost one, displacing liquor therefrom through the pipe 42 to the diaphragm chamber of the case 10.

Upon lowering of the temperateure sufficiently in the still the pressure of the ammonia gas in the cylinder 40 will be reduced and absorption will begin therein which will result in return movement of liquor from the diaphragm. At the same time the increase of strength of liquor in the still will result in more efficient distillation and predominant pressure therein which will further induce return movement of liquor toward the cylinder 40. Liquor will be thereby caused to pass inwardly through the tubes 43 causing an agitation of the content of the cylinder 40 which will result in efficient absorption of gas in the cylinder to permit prompt response of the device to changes of condition in the still.

If desired, the tube 88 may consist of a cylinder 50 as in Figure 13, divided longitudinally as at 51, and with a small tube 52 centrally through the horizontal partition having its lower end near the bottom of the cylinder and projecting slightly at the upper side of the partition. The upper or preferably the lower part of the cylinder is connected to the case 10, as before mentioned, the cylinder being about one-half or two-thirds filled with the aqua ammonia of the strength desired. In the action of this form of the device, if the upper chamber is connected to the valve device, on development of a predominating pressure gas will pass in part from any liquor which may be above the partition, and a certain amount will develop below the partition expelling liquor through the tube 52 from the lower chamber to the upper, and the pressure in the upper chamber will also be communicated to the diaphragm 28. When still pressure predominates there will be a slight return of material from the case 10 and absorption will occur both above and below the partition. Absorption below the partition will cause a vacuous condition tending to draw matter through the tube 52, which, if gas, will cause a disturbance of the liquor below by bubbling up therethrough, facilitating further absorption. Whether liquor or gas only returns from the case 10, absorption above the partition will cause an increase of volume in the liquor in the tube 50 and spilling thereof over the edge of the tube 52 breaking its surface layer and enhancing absorption further. If liquor returns from the case into the lower part of the cylinder its flow will agitate the liquor below and possibly also cause an upflow of liquor through the tube 52, depending on the quantity initially introduced into the cylinder.

In Figures 14 and 15 the conversion of the type of device of Figures 4 and 5 into one operating after the manner of the appliance of Figures 6 to 9 is shown utilizing the condenser pressure to counter-control action of the valve in conjunction with the tube 88. In this construction the valve box 80 is as before described, with bellows 87 similarly operated, and valve 81 operative to close the outlet. The yokes before used are eliminated, however, and also the tube 89. A bellows 55 is connected directly to the end of the bellows 87 and to the valve 81 whereby expansion of the bellows 87 may move the valve for opening. Within the bellows 55 a coil spring 56 is confined acting longitudinally of the bellows so as to oppose still pressure, which is always present in the box and that means also the condenser pressure. The spring 56 is preferably of a kind which increases its resistance to compression rapidly as it is compressed, so that relatively small movement will occur by its compression by increasing gas pressure. When the still pressure is relatively high this bellows 55 and spring will be slightly compressed, allowing a greater lap of the valve at the upper side of the effluent port of the box, and consequently requiring the valve to move a greater distance before it will be opened. This involves a higher temperature for opening of the valve than would be required when the bellows 55 is more extended. This arrangement would be serviceable when mercury or petroleum is used.

The same action is involved in the structure of Figure 14, in which, however, a simpler form of spring may be utilized. In this instance the box 80 is laterally enlarged sufficiently to accommodate two levers 57 of the first order commonly connected at their fulcrum, and respectively connected to the bellows 87 and valve 81 their long arms extending into the enlargement of the box and having connected and confined therebetween the bellows-enclosed helical spring 58, which need not be as strong as the one 56 and need not so markedly increase its resistance as compressed, as may be understood. The levers and spring form a connection by which the valve 81 is operated from the bellows 111, and this connection will shorten at high still pressures and lengthen at low pressures with the same effect as described in connection with the structure of Figure 13.

I have also found that use of a fibrous mass resistant to chemical reaction with ammonia and packed loosely in the tube, so as to have a material portion lying above the body of liquid in the tube, is useful in facilitating absorption in the tubes 88, 40 or 50 when necessary. I have used steel wool, iron filings, and asbestos. A fine closely lying body of fiber is desirable so that by capillary attraction liquid will be caused to ascend thereinto, increasing the liquid surface exposed. Sand of a suitable kind may be used; also glass granules. Such capillary distributing materials may be used either in a plain tube, or in conjunction with the partitioned structure or adaptation thereof as discretion may dictate.

In relation to the action of the liquid and gas in the tube 40 or 50 it may be pointed out that owing to currents produced by return of cool strong liquor from the transfer device in such systems either by inertia momentum or convection, there will be inequalities in cooling in different parts of the tube which will contribute to agitation of the contents by surges from one space to another, the aggregate effect, however, always contributing to the control actions, either in closing or opening the valve.

The control devices of the several forms illustrated are not intended to produce intermittent movement of liquor, but in operation they will act as throttle devices regulating the flow which will be continuous, ordinarily, but increased or decreased as conditions make necessary. Thus, while the valve 81 is shown closed, in a machine during normal operation the valve will be open constantly, and the action of the material in the tube 88 will ordinarily keep the valve so, but will open it further when the strength of the liquor is reduced. The device may of course be adjusted or constructed more sensitively, so that it will cut off entirely and open alternately.

In Figure 17 there is illustrated formally a still tank 100, having a bolted-on head 102 at one end, upon which there is pivoted a lever 103. This lever is pivoted below the liquid level therein, and is preferably made of a material having a minimum tendency to expand by the action of heat, an alloy known as "Invar steel" in the trade having been successfully used. Adjacent the far end of the lever a float 104 is attached to the lever, arranged to lie always submerged beneath the surface of liquor in the still. Firmly secured to the lever 103 near its pivoted end there is a thermostatic bar 105 extending beneath the lever and parallel thereto to its far end, where the end of the bar is supported slidably in a small bracket 106 on the lever. This bar is preferably made of steel or iron having a high coefficient of expansion. Near the outer end of the lever and bar they have connected pivotally to each other a short arm 107 of a bellcrank lever 108 having an extremely elongated arm 109 extending beside the bar 105 toward the pivot of the lever 103. The extremity of the arm 109 is rested upon a spring 110 mounted thereunder upon a screw plug 111 engaged through the bottom of the still so that the pressure of the spring against the arm 109 may be adjusted by screwing the plug in or out. At a suitable distance from the pivot of the lever 103 a valve 111 is carried thereby extending downwardly and adapted to seat in a port or other outlet from the pipe 113, opening into the still and adapted to receive weak liquor from the still for passage to the absorber in accordance with the operation of a system such as herein referred to.

By means of weight of the parts counteracting the buoyancy of the float 104 and also by means of the adjustment of the plug 111 by which the spring support of the arm 109 is adjusted, the device is caused to so act that the float 104 will always sink to its lower limit by reason of the weight acting thereon as long as the specific gravity of the liquor in the still is below a certain predetermined figure representing a strength of liquor greater than should be transferred to the absorber. As the ammonia is exhausted from the liquor, however, the specific gravity of the liquor increases until, when a sufficiently low content has been attained, the float will rise by reason of the greater weight of liquid displaced, and open the valve 111, by which the weak liquor will be permitted to flow through the pipe 112 to the absorber. The level being thus raised, in the absorber, stronger liquor will be carried back from the absorber to the still by the transfer devices such as I have disclosed in systems above referred to, and thereby the condition which caused the opening of the valve 111 will be reversed, the gravity of the contents of the still being lowered so that the float 104 again sinks and closes the valve.

As will be appreciated, the specific gravity of the still content is also affected by temperature, and as higher temperatures are involved in the still in the summer season than in the winter season for a given amount of distillation of ammonia from the liquor in the still, it will be understood that is necessary to counteract the tendency of the float to rise prematurely when high temperatures are required to exhaust the contents of the absorbent medium. That is the purpose of the bar 105, lever 107, spring 110 and spring adjustment. At high temperatures, expansion of the bar 105 pushing upon the lower end of the short arm 107 the upper end of which is pivoted upon the less expansive member 103, causes the long arm 109 to bear downwardly upon the spring 110, relieving part of the load or weight sustained by the float 104, and delaying the fall of the latter by which the valve 112 is closed, so that an actually lower specific gravity is attained in the liquor incident to higher temperatures than is involved when lower temperatures are manifest in the still. The requirements of such variations as are compensated for by this device are due to variations in the temperature of the cooling medium, such as water or air, as may be readily understood. During the summer season, owing to higher temperatures prevailing in the cooling medium, higher condensing pressure is involved in the condensing coils, involving correspondingly higher temperatures in the still to produce this pressure, by reason of which a given specific gravity would be obtained in the liquor when it has a higher content than would be involved at the same gravity reading during the winter season, when low condensing pressures would be involved, and correspondingly low temperatures in the still.

It will be understood that the control devices shown in the still may also be used in the absorber, with like effect, involving possibly a slight difference of adjustment. Thus, as the strength of liquor increases in the absorber a higher pressure will be involved thereby, which may be utilized to operate the same devices employed in connection with the still; also a higher temperature will be involved in the absorber when the strength of liquor therein increases, because by reason of the higher pressure in the absorber reacting back upon the evaporation in the expansion coils, a greater volume of gas passes through the expansion coils and greater heating of the absorber caused.

In the same way, the control device in Figure 17 may be used in the absorber at the weak liquor inlet (usually a port opening downward), excepting that the action of the valve 111 and lever 109 would be reversed, so that upon rising of the float the valve would be closed, and falling of the float will open the valve, substantially as indicated in Figure 18. Here the apparatus is mounted on the top of the absorber 115, the spring 110' corresponding to the spring 110 bearing upon the upper side of the lever arm 109' so that closing of the valve is less opposed at higher temperatures. That is, while in the structure of Figure 17 high temperature causes lever 109 to press more on the spring, in the structure of Figure 18 the lever 109' will press less on the spring.

The parts in this last figure corresponding to those of Figure 17 have the same reference numerals with the addition of a prime mark.

I claim:

1. In a refrigerating system of the character described, the combination with a means responsive to heat within the system for controlling distillation, of a means responsive to heat exteriorly of the system operatively associated with the said first named means in counteracting relation.

2. In a refrigerating system of the character described including a still, an absorber, means to convey liquor from still to absorber by still pressure including a still outlet and conduit therefrom to the absorber, a normally closed valve in the conduit, operating means responsive to heat in the still to open the valve at higher temperatures; compensating means responsive to heat without the system operatively associated with said operating means in a counteracting relation.

3. An improved control for a refrigerating system of the character described comprising a still tank, a liquor conduit therefrom for delivering liquor to an absorber, and a valve in the conduit, thermostatic valve operating means responsive to heat variations in the still operatively connected with the valve, and a compensating thermostatic means responsive to temperature variations exteriorly of the still operatively associated with the valve operating means in a counteracting relation.

4. In a system of the character described, a still, a gas circuit therefrom having a condenser including a heat exchange for diffusing heat in a fluid having a temperature corresponding to the season, a diaphragm, a pressure communicating connection between the still and one side of the diaphragm, a sealed tube in the still having a fluid therein capable of generating a pressure overbalancing that of the still when the liquor in the still is at a predetermined specific gravity and temperature, a pressure communicating connection between the tube and the side of the diaphragm opposite the first mentioned connection, a liquor discharge valve for the still and operative connection between the diaphragm and said valve.

5. A weak liquor transfer control comprising a conduit from the still to the absorber, a valve to close the conduit, a lever connected to the valve having a float at one end and having a fixed pivot at the other end, a heat-expansible member and operative connections between the expansible member and the float constructed to vary the effective valve operating force exerted by the float, in response to variation of temperature.

6. In a device of the character described, a valve, a lever having a fixed pivot and a float connected to its outer end, an expansible member fixed upon the lever adjacent one end and slidably mounted with respect thereto at its other end, a bell-crank lever having a short arm connected between the movable end of the expansible member and the adjacent part of the lever, and having a long arm co-ordinated with the lever for the purposes described, and an adjustable, resilient pressure member for the extremity of the long arm.

7. In a refrigeration system of the character described, the combination with a means responsive to one physical condition of matter in the system to control distillation, of a means responsive to another physical condition of matter active upon the system operatively associated with the first named means in a counteracting relation.

8. In a refrigerating system of the character described including a still and an absorber, means responsive to heat within the system for controlling distillation consisting of an expansible element exposed in the still, a conduit from the still to the absorber, a valve in the conduit operatively associated with the expansible element; and means responsive to heat exteriorly of the system operatively associated with the valve in counteracting relation to the expansible element and consisting of a cooling medium, a pressure transmitting connection between the interior of the system and said valve whereby high pressure will oppose the response of the expansible element to high temperature, a gas conduit from the still and a condenser receiving from the conduit and exposed to said cooling medium.

9. In a refrigerating system of the character described including a still and an absorber, means responsive to heat within the system for controlling distillation consisting of a heat-expansible element exposed in the still, a case having a diaphragm operatively associated with the expansible element, a conduit from the still to the absorber, a valve in the conduit operatively connected with the diaphragm; and means responsive to heat exteriorly of the system operatively associated with the first named means in a counteracting relation and consisting of a cooling medium, a pressure transmitting connection between the interior of the system and said case opposite the connection with said expansible element, a gas conduit from the still, and a condenser receiving from the conduit exposed to said cooling medium.

10. In a refrigerating system of the character described including a still and an absorber, a first means responsive to heat within the system for controlling distillation including a conduit from the still to the absorber, and a valve in the conduit operatively associated with said means responsive to heat within the system; and means responsive to heat exteriorly of the system operatively associated with the valve in counteracting relation to the said first means, and consisting of a cooling medium, a pressure transmitting connection between the interior of the system and said valve whereby high pressure will oppose the response of the first means to high temperature, a gas conduit from the still and a condenser receiving from the gas conduit and exposed to said cooling medium.

11. In a refrigerating system of the character described a still, an absorber, a duct connecting the still and absorber for transfer of weak liquor from the still to the absorber, a valve in the duct to control the flow therethrough, and a thermostatic device in the still operatively connected to the valve to hold the valve normally open during distillation and to throttle the flow of liquid from the still more or less as the operating temperature is low or high.

12. In a liquor control for a refrigerating system of the character described including a still and an absorber a liquid refrigerant absorbent therein, a conduit from the still to the absorber for strong liquid refrigerant, a valve in the conduit, a float in the absorbent operatively connected with the valve, and heat responsive means to vary the effective buoyancy of the float.

In testimony whereof I affix my signature.

RALPH E. SCHURTZ.